United States Patent [19]

Labrador

[11] Patent Number: 4,859,146
[45] Date of Patent: Aug. 22, 1989

[54] UNITED SAIL WINDMILL

[76] Inventor: Gaudencio A. Labrador, 1312 Leaf Terr., San Diego, Calif. 92114

[21] Appl. No.: 177,599

[22] Filed: Apr. 5, 1988

Related U.S. Application Data

[63] Continuation-in-part of Ser. No. 631,321, Jul. 19, 1984, Pat. No. 4,756,666.

[51] Int. Cl.$^4$ ............................................. F03D 5/02
[52] U.S. Cl. ............................................ 416/8; 415/5
[58] Field of Search ........................................ 416/7-8; 415/5

[56] References Cited

U.S. PATENT DOCUMENTS

| | | | |
|---|---|---|---|
| 443,641 | 12/1890 | Eastman | 416/8 |
| 1,526,631 | 2/1925 | Fagan | 416/7 X |
| 3,730,643 | 5/1973 | Davison | 415/5 X |
| 4,163,905 | 8/1979 | Davison | 415/5 X |
| 4,175,910 | 11/1979 | Nilberg | 415/5 X |
| 4,303,834 | 12/1981 | Li | 416/7 X |
| 4,572,962 | 2/1986 | Shepard | 416/7 X |
| 4,756,666 | 7/1988 | Labrador | 416/8 |

FOREIGN PATENT DOCUMENTS

| | | | |
|---|---|---|---|
| 975126 | 3/1951 | France | 416/8 |
| 2131490 | 6/1984 | United Kingdom | 416/7 |
| 2131491 | 6/1984 | United Kingdom | 416/8 |

Primary Examiner—Everette A. Powell, Jr.

[57] ABSTRACT

The object of this invention is to provide a large scale but low cost windmill by maximizing wind-contact out of the least cost of materials with least cost of maintenance. This is attained by making the sails (100) as large as possible using light materials such as framed fabrics or aluminum sheets, by arranging the large sails (100) to form a long life of parading sails in one direction transverse to the wind and another long line of the same kind parallel to the first line but moving to the opposite direction with which the first line makes a close loop, by using a strong light weight cable chain (101) that is tugged by the large sails and which also turns the terminal gears (102) located at the two ends of the loop, by using light weight vehicles to carry the large sails such as said Power Cable Chain (101) suspended high in the air or deep-grooved Roller Wheels (133) on rail tracks or wide-based inflatable/submersible boats (150) on the ocean, by providing a grid of strings (117 and 164) on both faces of the sail to withstand higher wind pressure, by elevating the sails high in the air thru the use of Aerial Cable Railway (132), by providing intermediary aerial supports to the cables to permit long line of construction.

12 Claims, 9 Drawing Sheets

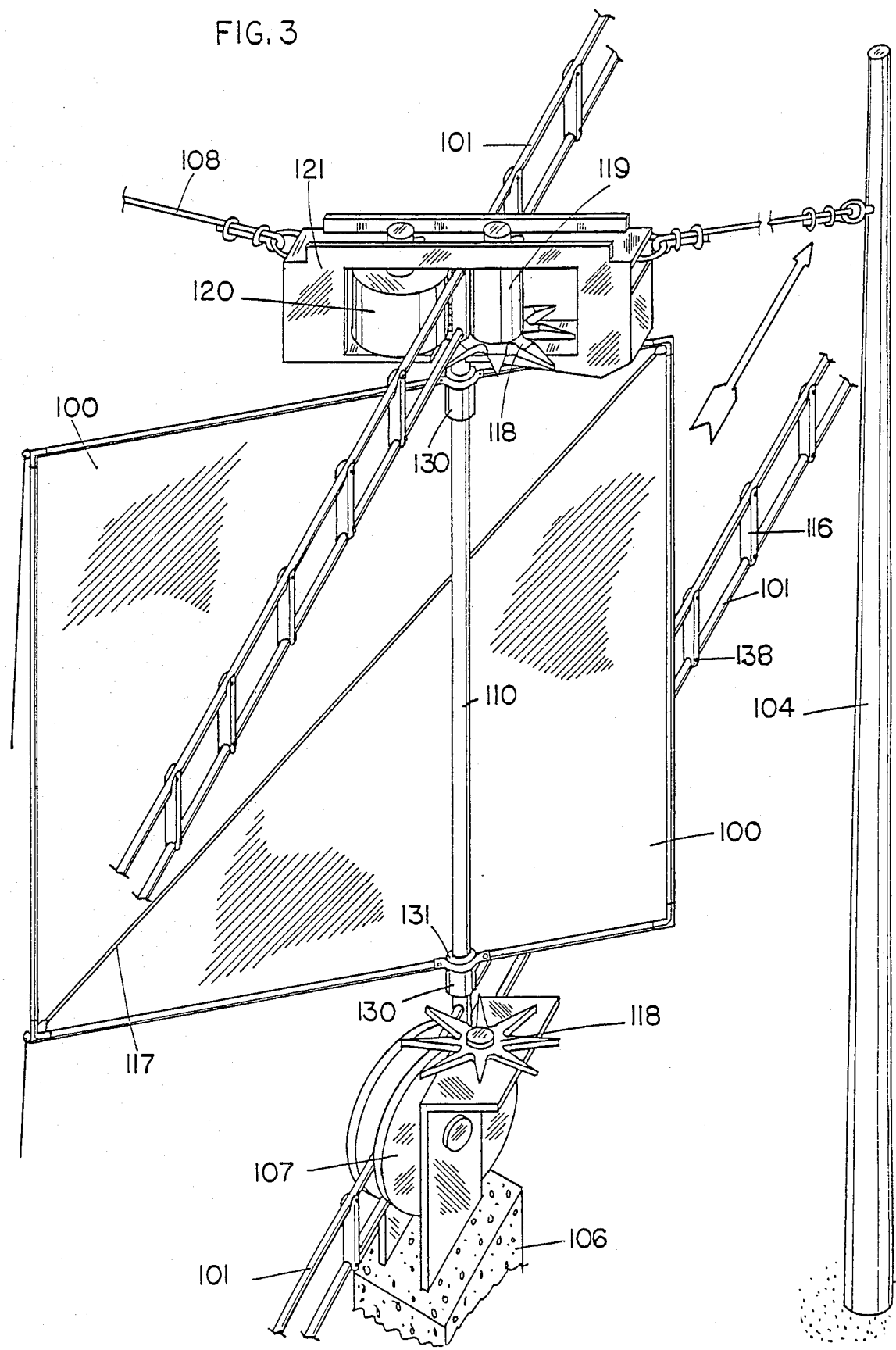

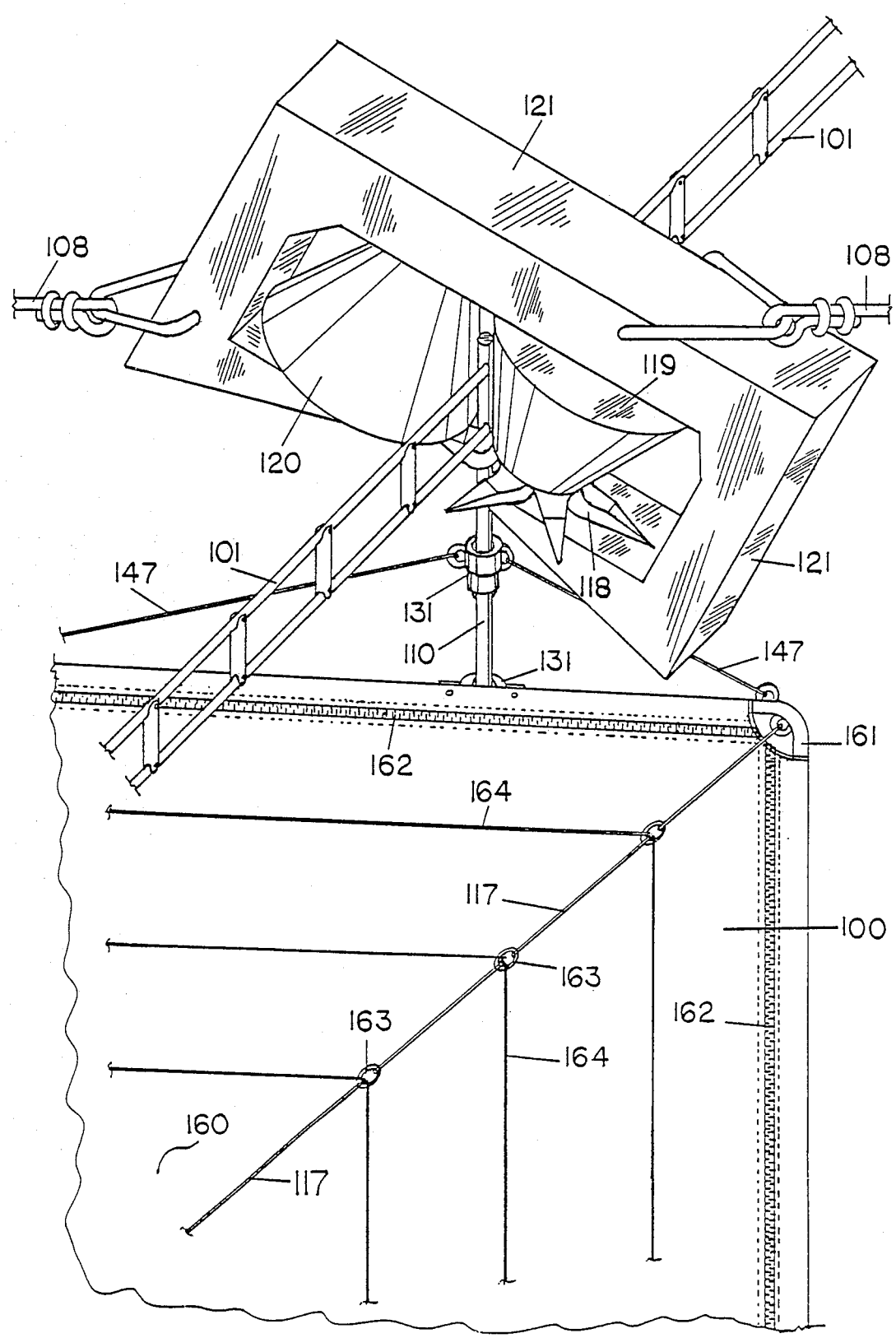
FIG. 3-A

UNITED SAIL WINDMILL

This application is a continuation in part of serial No. 06/631,321 filed 07/19/84 now U.S. Pat. No. 4,756,666.

BACKGROUND OF THE INVENTIONS:

1. Technical Field

My invention relates to new designs of windmills in several types to obtain maximum benefit from the energy offered by the wind in a given limited space at a minimum cost, in a large commercial scale.

In the convertion of the wind energy particularly by means of the windmill, it is very essential that the windmill be in contact with as much wind as possible that passes thru a given space at the minimum cost of materials, labor, maintenance, operation cost, and minimum use of project space (land or sea), in order to provide a competative energy cost to the consumer. This maximization of wind-contact is done by the use of large wind sails made as large as possible, as in the sail boats, with the use of a specially designed mechanical device that handles the large sails in great quantities, at least cost.

In this invention, particular attention is concentrated on the maximum harnessing of the wind energy that is available in a given space in the maximum effeciency and effectiveness of energy convertion out of whatever strength of wind that arrives at the windmill at the least cost of energy production. It is also the objective of this invention to produce a large scale windmill that is capable of driving a large irrigation pump or to make a remote area energy independent by making the windmill able to work during violent weather conditions to a certain limit (when energy is abundant) and able to store the energy in the form of compressed air, electricity, and/or hydrogen gas fuel at any location (land or ocean). It is also the objective of this invention to make the ordinary man able to construct his own energy machine and to free the poor nations from highly commercialized high technology machines. It is to ease the pressing problems of having to import energy from other nations when in fact there is so much energy at home. This is to effect distribution of wealth and to promote peace around the world thru self sufficiency of energy.

2. Background Art

The first prior art is the rotary blade windmill which has very limited power output capacity because it cannot be expanded large enough as much as it is wanted so as to increase the wind contact. Increasing the wind contact of the old rotary windmill is done only by attaching longer blades but only to a limited extent because the tip of the blades will be moving faster than the wind—that means loss of energy. This means that the old rotary type of windmill cannot be constructed to a very large scale for purpose of having as much wind contact as it might be wanted. There are also existing new designs of windmills such as those that rotate around a vertical axis but they are just limited to small sails carried by a single rotating expensive superstructure and that 50% of the sails serve as wind break for the other sails thereby making 75% of the sails not really working. There are also many designs of windmills using horizontal elongated endless chains carrying the sails that move horizontally but they are just designed for short span, for few number of sails, for small sails, and for fair weather conditions—there being no sufficient inexpensive intermediary mid-span supports for heavy vertical loads and for lateral wind loads to make it able to function on high speed winds. They all fail to met the requirements for the construction of low cost large commercial type of windmill that can take advantage of the abundant energy during violent weather. The construction of these existing old designs will be very expensive if they are made to carry very large wind sails.

The available wind being offered by nature is so much on land as well as on the ocean from sea level to 3 miles above the earth around the world, but the existing designs are just too small to tap the tremendous opportunity. From this view point, there must be another design of a windmill that can maximize wind contact any where at least cost in order to maximize benefits from the available wind, hence, the new inventions herein presented.

SUMMARY OF THE SUBJECT INVENTION:

The "UNITED SAIL WINDMILL" is designed to solve all the aforementioned problems or impediments encountered preventing the large scale commercial use of the aforementioned prior arts, and further intends to accomplish the functions of the crises creating "OIL" and/or the dangerous expensive nuclear energy in the poor nations.

The Objectives of this invention:

1. To produce a large commercial scale windmill, built as large as space may allow in one setting of construction, with out additional construction of individual set-ups of integrated units of windmills;

2. To produce a large windmill that maximizes wind contact at a given limited space at the least expense of construction and operation (inland or ocean);

3. To produce a large windmill that can maximize benefit from the wind by taking the opportunity of collecting energy from the wind at higher wind speeds (during the times of abundance) and able to store said energy in the form of compressed air or elevated water, or hydrogen gas.

There are many existing designs of windmills in the form of sails moving horizontally around a vertical axis and some tugging endless chains but the existing methods and/or procedures in handling the sails are just for small sails, for short span of suspension, or for a few number of sails at very expensive support structures resulting to a low Wind-contact/Expense ratio, therefor, these existing designs cannot be used in large commercial scale, they being uneconomical. To come up with a design of high commercial competitiveness and to attain the objectives as set forth above, the following methods of embodiments have been conceived:

1. By making the sails in the form of square face, built out of durable fabrics that is framed on a light rigid frame, built as large as it can be handled by the support structures, held in place along one straight line in great quantities and do the same in the opposit line parallel to the first line, arranged along said lines close to one after the other on a single file with a clearance allowing each sail to flip to the left or flip to the right, each sail supported by a vertical mast attached to the one-third point of the sail's width;

2. By providing a means to carry the large sails thru a long line or span high above the ground such as an Aerial Cable Railway, as illustrated in FIG. 6 which relieves the Power Cable Chain from supporting the dead weight of the large sails—a situation that gives the opportunity to build the terminal stations further away from each other (may be a mile or more apart or accross mountain canyons), each sail being carried by deep groove roller wheels that rolls on said Aerial Cable Railway at the top and at the bottom of each sail mast;

3. By providing a means to support the Terminal Gear Wheels high above the ground that provides a clear and wide passage for the large sails to pass thru freely without the need of making the diameter of said gear wheels very wide to accomodate the width of the large sails while transmitting the energy to the Power Shaft as illustrated in FIG. 4 and 5 effectiveness in wind deflection is proportional to sail's width;

4. By providing a means to separate the FIrst Line of parading sails far away from the Opposit Line of parading sails to give more Wind Contact to both lines by installing three Terminal Gear Wheels at a Half-Hexagonal formation at each level of the Power Cable and at each of the opposit Terminal Stations, as illustrated in FIGS. 4, 5, 6, 7.

5. By providing a means to reduce the load of the Aerial Cable Railway and to remove excessive sag of said catenary aerial railway—in the form of Intermediate Span Supports that are either directly on top of wood poles or suspended from ropes/steel wires, which do not interfer with the free rolling of the said Deep-Groove-Carrier Wheels on the aerial railway, as illustrated by Part 137 in FIG. 6—a condition that gives the opportunity to build the the terminal stations further away from each other (may be a mile or more apart) and also gives the opportunity for the aerial railway to carry much larger sails, at the same time these said Intermediate Span Supports will also prevent the aerial railway from swaying sideward due to the horizontal force of the wind;

6. By providing a means to carry the large sails thru a wider open free space such as the ocean thru the use of ocean going boats in the form of an "H" frame made of floater pipes filled with compressed air, each boat carrying one large sail and tugging a single Power Cable Chain that is common for all boats. Said power-cable chain loops around two terminal stations that are floating one the ocean set one mile or more apart from each other, each terminal station carrying three Terminal-Gear Wheels that are set in a Half-Hexagonal formation as illustrated in FIG. 7 and part 153 and 102.

7. By providing a means to carry the large sails thru the wide open plain fields such as a Railroad Track that provides a track for the Hook Roller wheels to guard against over-turning of the sails, as illustrated in FIG. 6 an opportunity to carry more larger sails;

8. By providing a means to store energy during times of abundance by allowing the windmill work at higher wind speeds and storing the energy in compressed air tunnels or in the form of hygrdogen gas, thereby creating an opportunity to store the energy of the storm. This is done by providing extra control system to the large sails in the form of automatic breakage of the control string Part No. 111.

ADVANTAGES OF THIS DESIGN OVER THE PRIOR ARTS:

1. There is more wind contact out of the project site space available and out of the volume of materials use at the least labor because the size of sail is maximized at the minimum support structures and the sails are placed close to each other;

2. The efficiency in deflecting the wind is much higher because the sails are made very large and very wide;

3. Slippage of the Power-Cable Chain thru the Terminal-Gear Wheels is prevented because of the presence of drive teeth clamped to the said Cable Chain specially when there is too much sail to drive the Power-Cable Chain, thereby preventing the upper chain to move faster than the lower chain that will result to destruction of the whole windmill, and further, energy is more efficiently transmitted to the terminal gears;

4. There is much better opportunity to use larger sails and to put more quantities of sails into each unit of windmill because of the use of and/or the presence of the Aerial-Cable Railway that carries the whole weight of large sails, and more specially effective with the provision or the presence of Mid-span Intermediary supports to the Arial-cable Railway as illustrated by Part No. 137 in FIG. 5 at a better wind contact it being that the large sails are more effectively carried high above the ground;

5. There is more flexibility in separating the First-Line of Sails far away from the Opposit-Line of parading Sails (may be 200 feet or more apart) for better wind contact—because of the Half-Hexagonal formation of the three Terminal-Gear Wheels at each level of each Terminal station, without having to use wide diameter gear wheels, as illustrated by Part No. 102 in FIG. 4, FIG. 6 and FIG. 7.

6. There is better opportunity to construct the two (2) Terminal Stations further away from each other (may be a mile or more) specially on ragged terain, and make the windmill as large as desired, due to the presence of Mid-span Intermediate supports to the aerial cable railway without interference to the free flow of the sails;

7. It provides the opportunity to store the energy of the storm or the higher wind speeds because it can drive a compressor at high speed and store the energy in compressed air tunnels up to a certain limit of wind pressure upon the sails where the control string Part No. 111 breaks-off;

8. As illustrated in FIG. 7, this design brings about the opportunity to use the wide and free open space of the ocean for industrial activity such as windmill project site, using ocean going boats to carry the sails in large sizes and in great quantities;

9. As illustrated in FIG. 6, this design opens the wide plain desert lands for industrial activity for the production of energy using much larger sails running on railroad track on the ground.

UTILITY:

1. It is used for converting the energy of the wind into usable and storable energy in large commercial scale specially in the non-oil countries, in the form of compressed air, hydrogen gas, and elevated water;

2 . It is used to produce large quantities of energy in the place where the energy is needed avoiding the construction of expensive transmission lines;

3. It is used to drive large irrigation pumps directly out of the wind energy;

4. It can be used to convert the ocean current by constructing it underwater.

It should be noted herein that because the wind has no constant force, it is most desirable that the wind energy be converted into compressed air which will drive the generator in order to have a constant voltage output. The irrigation pump and the compressor pump do not need constant force, so they can be connected to and driven directly by the windmill.

The "UNITED SAIL WINDMILL" is designed to solve all the aforementioned problems or impediments ecountered preventing the large scale commercial use of the aforementioned prior arts, and further intends to accomplish the functions of the crises creating "OIL" and/or the dangerous expensive nuclear energy in the poor nations. This newly invented windmill is designed to have as much wind contact as may be desired at the least cost and intends to work even during the violent weather when the energy is abundant which is to be stored in the form of compressed air in large underground tunnels.

There are elevent (11) inventions being applied for Patent Rights under this presentation, namely: (1) "Type No. 1 United Saidl Windmill" as per FIG. 5; (2) "Type No. 2 United Sail Windmill" as per FIG. 7; (3) "Type No. 3 United Sail Windmill" as per FIG. 6; (4) "Suspension Holder for a Running Chain Having Vertical Bar Loads" as per FIG. 3 and FIG. 3A; (5) "Light Weight Cable Chain" as per FIG. 3 parts 101, 116, and 138; (6) "Roller Pulley with Gear-Lock Running on/off a Suspended Cable Rail", as per FIG. 5; (7) "Cable Rail Switch on/off Connector" as per Part No. 135 having windows 136 as shown in FIG. 5; (8) "Cable Rail Intermediary Suspension Support" as per part 137 which have windows as shown in FIG. 5; (9) "Type No. 4 United Sail Windmill" as per FIG. 1 and FIG. 2; (10) "Type No. 5 United Sail United as illustrated by FIG. 4; (11) "Type No. 6 United Sail Windmill" as per FIG. 8.

How these presented inventions solve the aforementioned problems of the prior arts:

1. The "UNITED SAIL WINDMILL TYPE-I", TYPE-II, TYPE-III, TYPE-IV, TYPE-V, and TYPE-VI all solve the maximization of wind contact by the use of light weight sails permitting it to be constructed as large as it can be handled by the supporting mechanism and attaching as many sails as desired into the system to deflect all the winds that cross the line of the windmill as shown in the drawings. In operating windmills in a large commercial scale it is very important to maximize wind contact in a given land space, at a given strength of the supporting mechanism, and at a corresponding strength of the supporting structures. The Output/Cost Ratio must be very high and this is done by: (a) Deflecting as much wind as possible that is available within the limits of a given land space; (b) Making the windmill work at wide range of wind speeds specially at higher speeds to take advantage of the abundance of energy converting it directly into compressed air and storing it in large underground tunnels or subteranian cavities, then the compressed air will drive air operated electric generators and other machines at regulated releases up to long extended time after the wind had stopped; (c) Using the least, light weight, strong materials, and low cost material; (d) Constructing the windmill in multi-level using common support structures and supporting mechanisms to take advantage of the higher wind speeds at the higher elevations thereby increasing the output while minimizing use of land space; (e) Interconnecting the compressed air pipes of several large windmills to make them work in consortium to fill up a common depository large air tank in order to drive a common large electric generator; (f) Providing intermediary suspension supports to the power chain or to the aerial cable railway along the span length in order to permit construction of a very long span (a mile or more) of an aerial cable suspension windmill and so that it can carry larger wind sails thereby minimizing construction of main terminal support structures—that means less structural support per square foot of wind contact;

2. The herein presented inventions No. 4, No. 5, No. 6, No. 7, and No. 8 are the most important components that brought out the possibilities of expanding the different types of United Sail Windmills into very large windmills as may be desired because they make the windmill work and stand rigid against strong winds thereby allowing the construction of a very powerful windmill.

3. By constructing a large windmill floating on the ocean as illustrated by invention No. 2—United Sail Windmill Type 2—in the form of Sail Boats in a long single line formation tugging a long common cable/chain, a large portion of the ocean which is free can be converted into a wind farm. In case of violent weather these boats will be submerged underwater and then refloated after the hurricane is gone. Thru this method, maximum benefit from the wind over the unlimited ocean is made possible.

4. The low cost of construction with a resulting high power production attracts the investors to go into a large commercial scale of operation. The old existing windmill has a very high cost of power production which is the largest drawback against its commercialization.

BRIEF DESCRIPTION OF THE DRAWINGS:

FIG. 3 is a detailed perspective view of the alternative method of constructing mid-span intermediary suspension support system for the upper and the lower Power Chain, which prevent derailment during violent weather.

FIG. 3-A is a perspective view of an improved mid-span intermediary suspension support system for the upper Cable Chain, and also showing a reinforcement for the sail by means of a Grid of strings on either or both faces of the sail.

The Six Types of United Sail Windmill:

There are six types of newly invented windmill presented in this application accompanied by several newly invented mechanical components.

Figure 1:
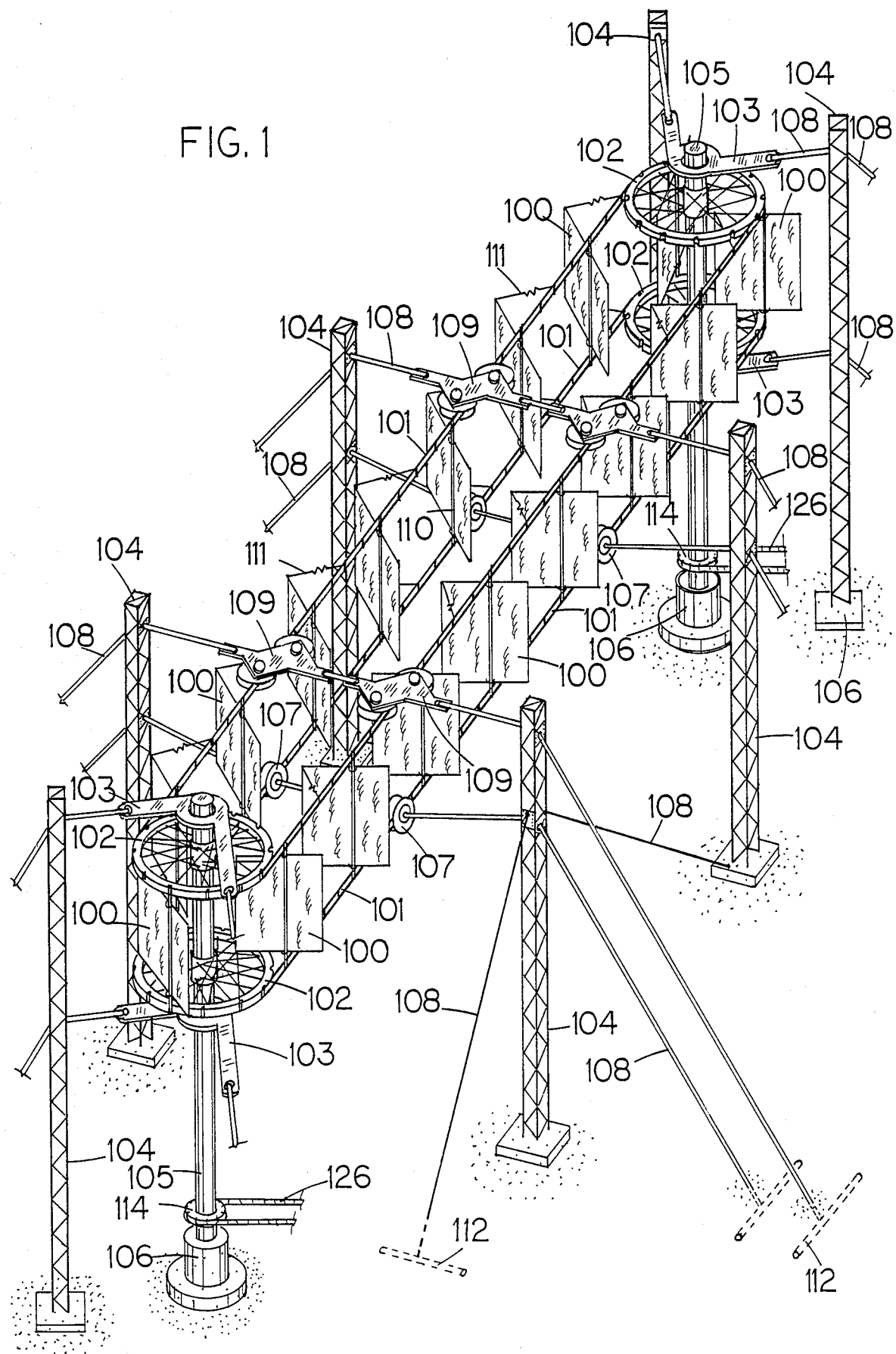
FIG. 1 is a perspective view of the United Sail Windmill showing the embodiment described in claim-4 wherein the sails are directly carried by the Power Chain.
Figure 2:
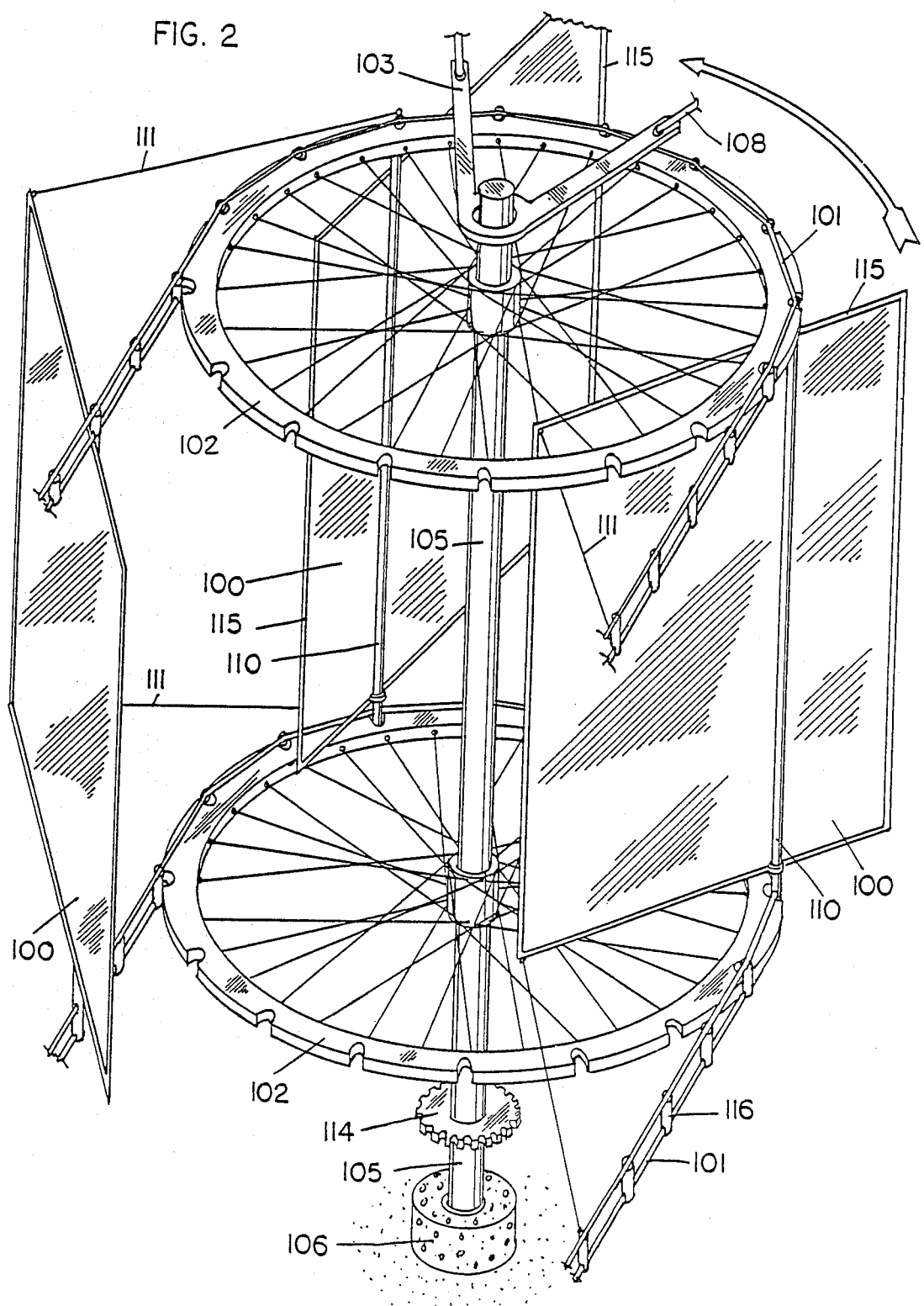
FIG. 2 is a detailed perspective view of the Terminal Gear Wheel of the windmill in FIG. 1 showing light weight construction of the Terminal Gear Wheels and of the Power Cable Chain.

1. The first invention is "Type No. 1 United Sail Windmill" as illustrated by FIG. 1, FIG. 2, and FIG. 3 of the preceding Patent Application under Serial No. 06/631,321 dated July 19, 1984 which has been allowed, and further illustrated by the herewith accompanying FIG. 5 indicating therein certain additional improvements of the support system such as part No. 134, 137, 135 and 136. This Type No. 1 United Sail Windmill, as has been described in the said preceding application, is in the form of an assembly of large wind sails in great quantities, each sail carried by deep groove wheels connected at the top and at the bottom of each mast rolling on and along suspended Aerial Cable Railways (132) that carry the whole weight of all the said large sails (100) including the weight of the Power Cable (101) and the deep groove Wheels (133). Each said large Sail (100) tugs the Power Cable (101) at the top and at the bottom of the Mast (110), forming a long line of parading sails transverse to the wind in one direction and another long line of parading sails in the opposit direction parallel to the first line after making a turn at the terminal gear wheels (102) thru and Aerial Railway Switch (on/off)(135) as per herewith FIG. 5. The Power Cable (101) is a strong rope which has teeth clamped to it (in addition to the Mast 110 securely attached to it) to drive the terminal gear wheels 102 with out slippage in order to maintain the vertical position of the sail mast 110 by not allowing any of the Power Cables to move forward faster than the other Power Cable. There are two terminal loops of the Power Cable that are quite apart from each other (may be ½ or 1 mile or more) in order to contact more wind corresponding to the maximum strength of said Power Cable and the terminal gears and to accomodate more sails in the long line of the parade. There are three (3) Terminal Gears at every loop of each of the power cables, that are spaced one or two sails apart held in place at a half-hexagon formation by horizontal arms of a superstructure at the center of the loop or outside the loop as shown in FIG. 1. Said three (3) terminal gears at each loop of the upper power cable are synchronized to to each other by a synchronizing chain to collect the energy from each of said 3 terminal gears as they are all driven by the drive teeth of the power cable. The same procedure is done with the terminal gears of the lower power cable. The special design of the long horizontal arms of the superstructures supporting the terminal gears in a half-hexagon formation is to create a wide and spacious free passage of the large and wide sails thru the terminal station with out using expensive wide diameter terminal wheel gears. The energy is collected at the terminal station thru power gear wheels interconnected by power chains. The speed of the upper power cable is synchronzied with the speed of the lower power cable by the vertical power shaft as it is driven by the upper power chain and by the lower power chain at the same time in order to maintain the vertical position of the sails by not allowing either one of the power cable move faster than the other thru slippage or thru difference in circumference of the terminal gear wheels. The suspended aerial cable railway is a strong rope supported to be on level with the power cable, having a long span and beyond the terminal station, supported at intermediate points along its span length to act upon the heavy weight of the large sails and to act upon the strong horizontal force of the wind, as illustrated by part 137 in FIG. 5. This provision prevents excessive sagging and overloading of both the aerial cable railway and the power cable specially if the windmill is constructed to a very long span (a mile or more). It is also important to note that the mid-span intermediary supports (part #137) for the aerial cable railway provide a clear spacious passage for the large wind sails whether they flip to the right or they flip to the left as it has been done at the terminal station. Said mid-span supports, part #137, may be mounted on top of wood poles if installed to support the lower aerial cable railway, but for those part #137 installed to support the upper aerial cable railway they are held in place by high tension ropes transvers to the railway and suspended from top of wood poles or superstructures. It is also important to note that the groove of the carrier wheels (Part #133 in the drawings named Roller Pulley) must be deep enough at least 5 times the diameter of the rope aerial cable railway (Part 132 in the drawings named Steel Cable) so that said carrier wheels will not be derailed during strong winds as the weight of the large sails presses it down to the said rail. The aerial railway switch (Part #135 in FIG. 5) is a new special design to provide easy installation of aerial rail switch at the exact location of turn off/on for the carrier wheels (part #133). It is also important to note that it is a lot cheaper to construct using materials in tension rather than using materials in compression, this principle is done in this invention. Gear lock 134 prevents roller 133 from being de-railed.

Figure 7:
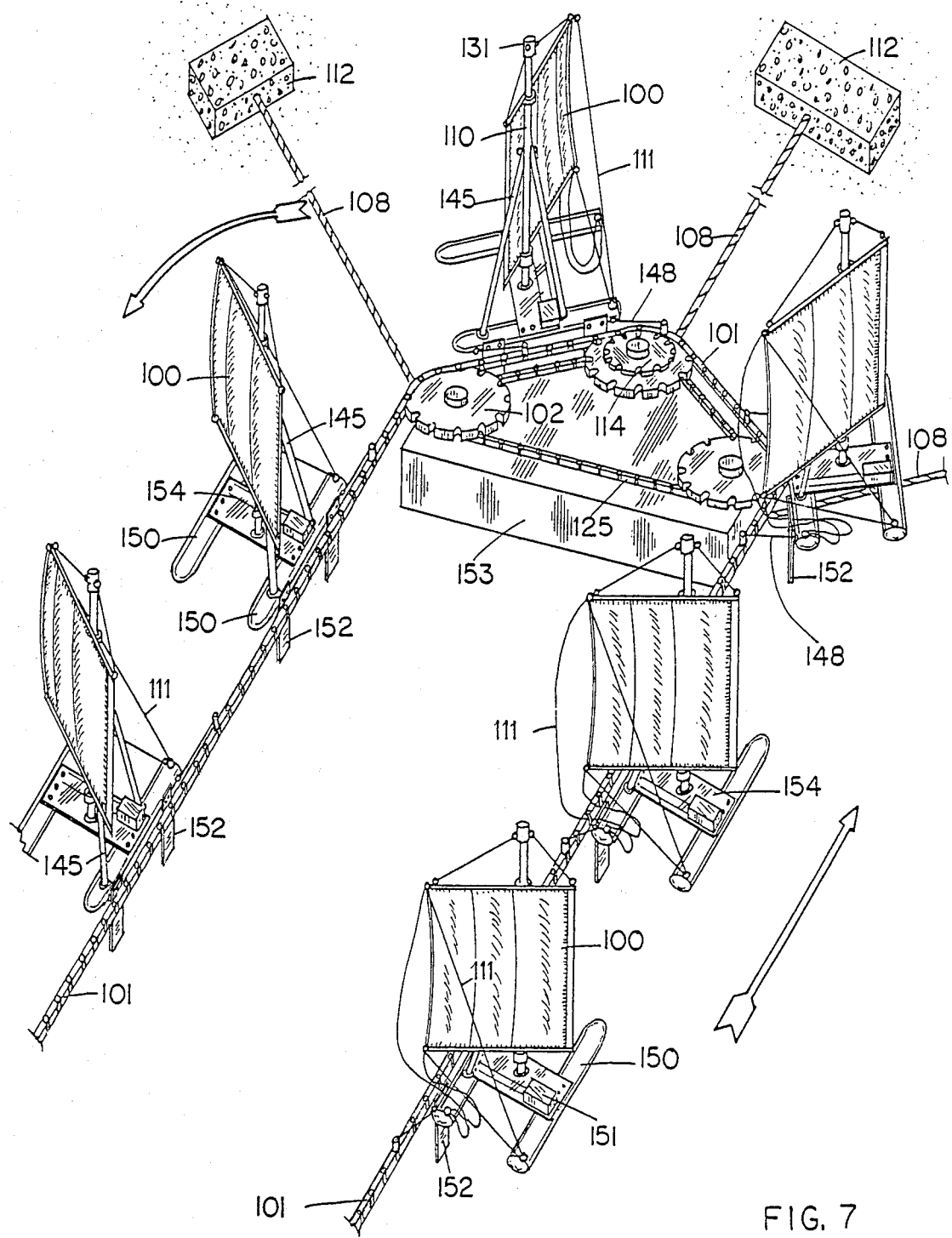
FIG. 7 is a detailed perspective of a United Sail Windmill that is constructed on the ocean wherein the sails are each carried by a wide-based inflatable/submersible boat, as descibed in claim-6.

The second invention applied for in this application is the "Type No. 2 United Sail Windmill" as illustrated in FIG. 7 which is in the form of an assembly of large wind sails (100) in great quantities spaced at 2 sails apart, parading in a single file in a long line transvers to the wind in one direction and another long line of parade of the same kind in the opposit direction parallel to the first line as each sail makes a turn at each of the two (2) terminal stations that are constructed far apart at one or more miles apart, each sail carried by a large "H" frame floater or boat in the form of pipes filled up with compressed air, each boat tugging a common long endless cable chain which drives the terminal gear wheels at the said two terminal stations. Said terminal stations are carried by floating pipes filled up with compressed air, each station carries three (3) terminal gear wheels which are driven by said cable chain. This type of windmill can be floating on the ocean (may be international waters) or on a lake, or on a man made long channel. As in the "Type No. 1" windmill, this "Type No. 2" windmill may be provided also with mid span intermediary lateral support to prevent the boats from swaying away from the desired line of travel as the wind will push them sideward. This whole system may be submerged under water during violent weather by releasing the compressed air from the floater pipes that carry the boat and those that carry the said two terminal stations to save it from distruction by the storm. The two said terminal stations are being pulled apart away from each other by nylon rope or steel rope anchored to the ocean floor in order to stretch the cable power chain and make it taut full length as the sail boats pull the floating terminal stations toward each other. It is hereby emphasized to note the maner in which the sail mast is erected on each of the boats. Note that the mast is held erect by two struts both standing on one floater pipe that is nearer to the power cable chain, one strut leaning perpendicular to said floater pipe and the other strut leaning at accute angle from the front end of said floater pipe—thereby forming a right angle triangular pyramid with the mast vertical, the purpose of which is to be able to slip the sail to the left perpendicular to the floater pipe when it is fully blown up by the wind to place the force of the sail almost coaxial with the power cable chain, as the whole assembly should be positioned such that the boats will be cutting across the water waves to prevent tipping over during stormy weather. Another important feature of this invention is the Automatic Balancing Load referred to in FIG. 7 as part 151, a counter weigth that moves across the boat opposite to the weigth of the sail actuated by the flipping of the sail to the left or to the right assisted by comressed air or other mechanical devices, in order to add stability to the boat without enlarging the boat. Compressed air will be delivered to the land by pipes.

Figure 6:
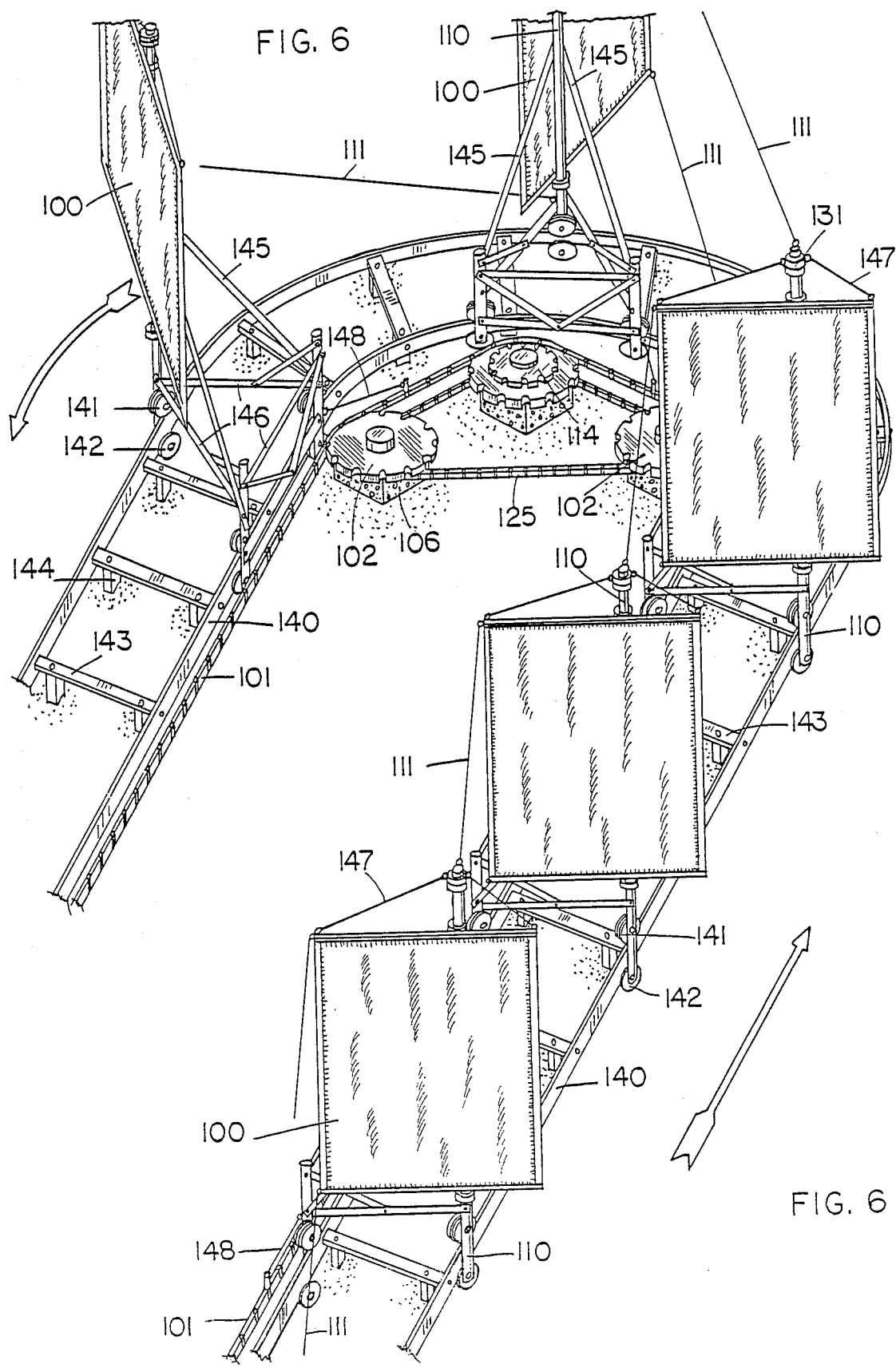
FIG. 6 is a detailed perspective view of a United Sail Windmill wherein the large sails are carried thru a pair of elevated rail track on land, as described in claim-3.

The third invention applied for in this application is the "Type No. 3 United Sail Windmill" as illustrated in FIG. 6 which is in the form of an assembly of large wind sails (100) in great quantities spaced at 1 sail apart, parading in a single file in a long line transvers to the wind in one direction and another long line of parade of the same kind in the opposit direction parallel to but at least 200 ft from the first line as each sail makes a turn at each of the two terminal stations that are constructed on the ground far apart (one or more miles) from each other, each sail being carried by a vertical mast the bottom of which is on deep groove roller. Rail Wheels rolling on a ground rail road track that makes a closed loop around the said two terminal stations. The said mast is held vertical by two struts each base of which is on deep groove roller Rail Wheels rolling on the inner ground rail track that is parallel to but ½ sail-width away from the said first rail track. The top ends of said struts are securely connected to the upper third point of the mast forming an equiangular triangular pyramid structure (145 and 146). The bottom of the mast (110) is laterally supported by rigid braces connected to the bottom of said struts to keep the mast 110 always vetical. Rigid braces are also used to keep the wheels of the said struts stay vertical and to keep the correct distance between said struts. The base of said two struts are connected to the Power Cable Chain (101) by key clamps which also serve as drive teeth to drive the terminal gear wheels (designated as 102—power pulley in FIG. 6. The Power Cable Chain 101 being tugged by each of the large sails, moves thru its loop around the said two terminal stations, and drives the terminal Gear Wheels by means of its drive teeth that fits snugly into the key-notch of the Gear Wheels at each terminal station. There are three Gear Wheels (102) at each station, arranged to form a half-hexagonal formation with a wide diameter to make the opposit traffic of sails receive more wind it being st least 200 ft away from the first line, and synchromized to each other by a gear chain that collects the energy from each gear wheel that is imparted to it by the power cable chain and to prevent slippage. The rail track may be in the form of a channel beam laid on its side so that the Hook Roller will be running under the top flange, or that the rail track may be in the form of rectangular timber beam elevated at least one foot clear from the ground so that the Hook Roller will be running under the rail it being that the rail wheels as well as the Hook Roolers will all be deep groove rollers. The Hook Rollers are necessary to prevent the whole sail assembly from overturning during strong winds.

For Type No. 4 United Sail Windmill—see embodiment of FIG. 1 and FIG. 2.

Figure 4:
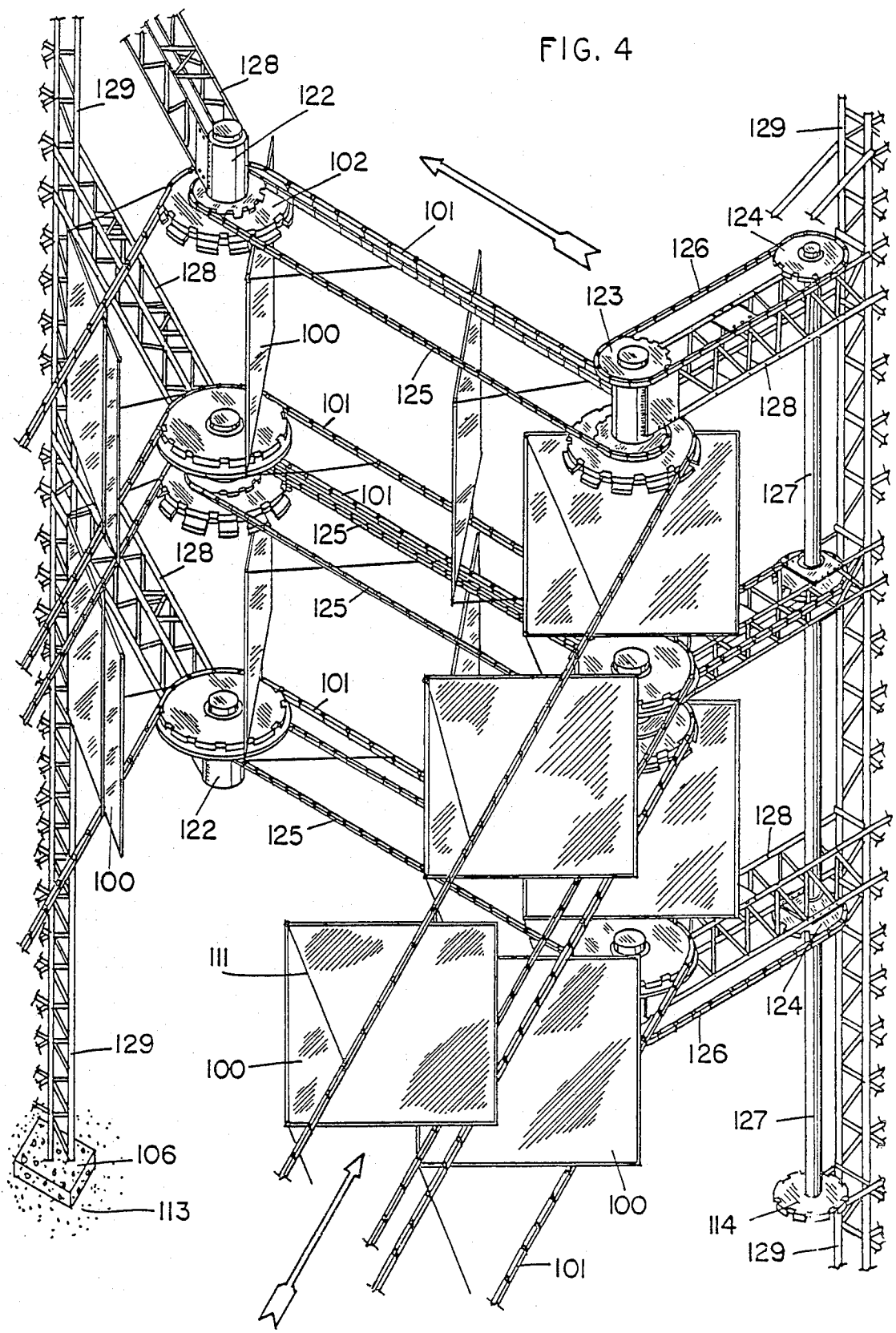
FIG. 4 is a detailed perspective view of the Terminal Station of a Multi-level windmill using the Power Chain as Carrier for the windsails.

For Type No. 5 United Sail Windmill—see embodiment of FIG. 4.

Figure 8:
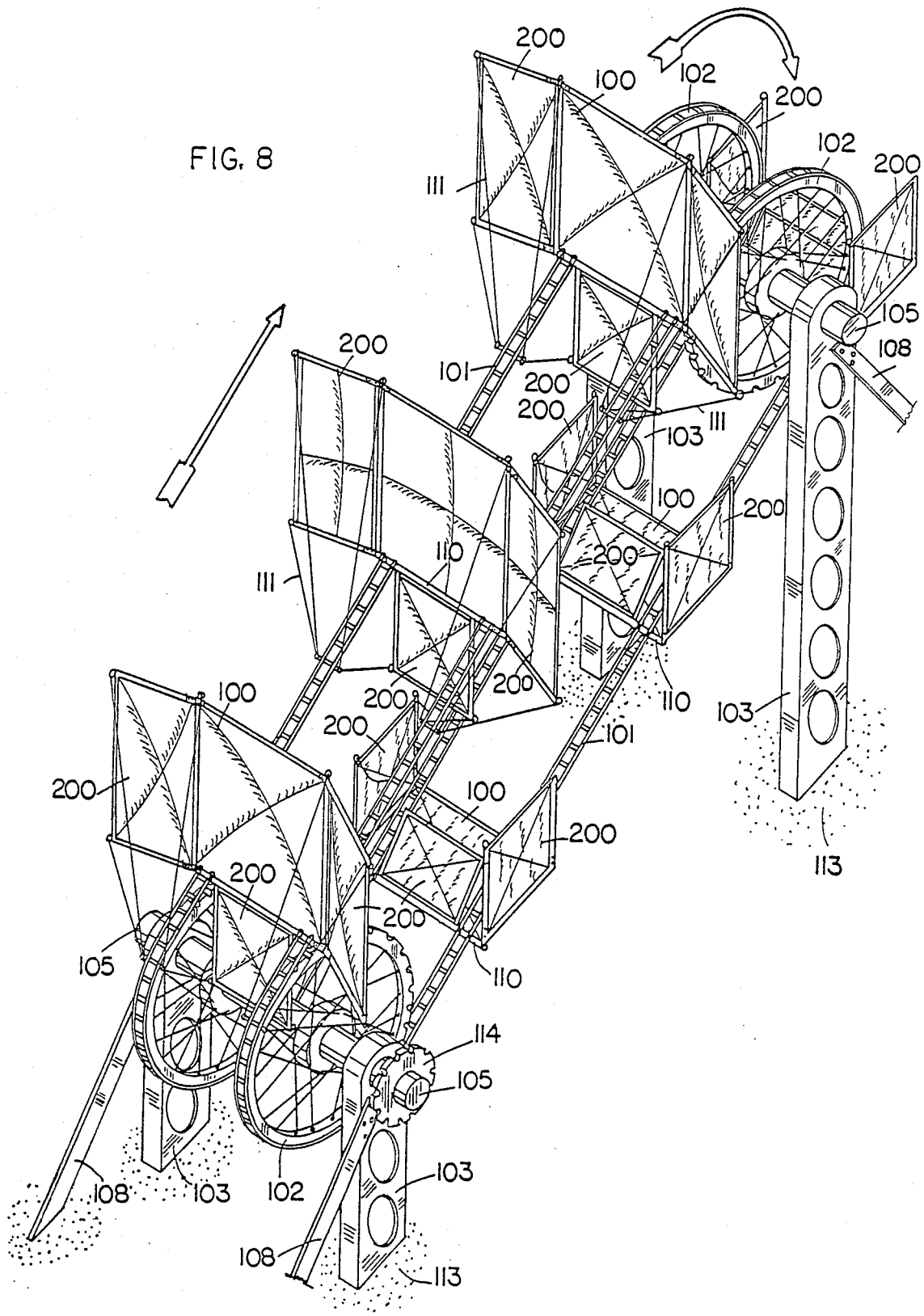
FIG. 8 is a detailed perspective view of the windmill wherein the sails are folding that open up against the wind and wherein the axils of the Terminal Gear Wheels are horizontal.

For Type No. 6 United Sail Windmill—see embodiment of FIG. 8.

DESCRIPTION OF THE PREFERRED EMBODIMENTS:

FIG. 1 and FIG. 2 illustrate an embodiment of the invention No. 9 named as "UNITED SAIL WINDMILL TYPE-3 which is moved and energized by wind that blows from any direction. As the wind blows the sail 100 resist or deflects the wind thereby exerting effort thru the control string 111 and the sail mast 110 upon the upper and the lower power chain 101 in a counter-clock-wise direction. As the Power Chain 101 moves it turns the terminal pwer gear 102 (upper and Lower) in a counter clockwise direction too. As the Power Gear 102 turns the vertical axil 105, which holds and synchronizes the movements of the upper and lower Power Gear, will also turn the Power Take-Off Gear 114. The vertical axil 105 is held in place at the top by the structural support (with bearing) 103, and held in place at the bottom by structural footing (with bearing) 106 anchored to the ground. The structural support 103 is held in place by tall standing structures 104 (wood poles, steel poles, or steel towers) which are in turn held standing rigid by guys (rope, chain, wire, and tension bar) 108. To relax the Power Chain, it is carried by intermediary roller support 107 at the bottom which is sitted on footing 106. To prevent the upper chain from swaying left or right due to the horizontal force of the wind, the lateral support 109 is designed to hold the upper chain 101 in place. The lateral support 109 is supended in mid-air by strong wire rope 108 and tall structures 104 which are in turn anchored to the ground by by achore block 112.

FIG. 3 illustrates an embodiment of the invention No. 4 named as "SUSPENSION HOLDER FOR A RUNNING CHAIN HAVING VERTICAL BAR LOADS" the function of which is to hold the Power Chain 101 in place while said chain is running with the ability to prevent vertical and lateral movement of said chain at the same time allowing the vertical mast of the wind sail to pass thru said holder. As the Power Chain 101 carrying the sail by the vertical mast 110 moves thru said holder the roller 119 together with the long toothed gear will be rotating. Every tooth, having been constructed like an inclined plain, will be sliding under the said chain producing a lifting effect on the chain 101 at the same time the vertical bar 110 (sail mast) passes freely between the teeth of the lock gear 118 (long tooth gear). The roller 120 keeps on pressing the power chain 101 against the roller 119 so that the chain 101 will be forced to slide over the teeth of the lock gear 118. Another chain holder is the one holding the lower chain 101 at the bottom of the sail 100. This holder is an ordinary roller pulley that exert up lift support and lateral support to the lower power chain. To prevent the chain from getting out of the pulley during violent weather, the lock gear 118 is installed over the chain. Said lock gear 118 is freely rotating horizintally on top of the lips of the roller pulley 107 preventing the chain 101 from moving up at the same time allowing the vertical bar 110 (sail mast) to pass thru and over the roller pulley 107.

FIG. 3 also illustrates the imbodiment of the invention No. 5—"LIGHT WEIGHT CABLE CHAIN" which is in the form of two parallel cable ropes 101 (made of steel or nylon strands) joind together to form a chain by means of short bars 116 (made of nylon tubes or metal tubes) attached perpendicular to the ropes 101—one rope clamped to one end of said bar 116 and the other rope clamped to the other end of said bar 116. The length of said bar depends upon the thickness of the terminal gear 102. The distancing of said bar 116 depends upon the distancing of the teeth of the terminal gear 102. The bar 116 is clamped very tight to the rope 101 by means of the bolt 138 which passed thru the center of the rope 101. This type of chain is very much stronger in tension than any other types of chain of its equal weight. The ideal chain for a windmill specially the type herein presented must be made as light as possible.

FIG. 3-A in drawing sheet 9/9 illustrates an embodiment of the invention No. 4 named as "SUSPENSION HOLDER FOR A RUNNING CHAIN HAVING VERTICAL BAR LOADS" in its second alternative form having the same purpose and function as that Suspension Holder shown in FIG. 3. The main special feature of this alternative design is that the long toothed gear 118 is tilted 30 degrees such that the teeth holding the power chain 101 are at higher elevation at the left while the teeth going away from said power chain move down ward as said gear 118 rotates to the right. The purpose of tilting said gear 118 is to produce a lifting effect by the teeth upon the chain 101 over the out going teeth as said gear 118 rotates in which case there will be no need any more for roller 120 to push the chain 101 to slide over the inclined plane upper surface of the said long toothed gear thereby preventing wear and tear uppon the chain 101 due to too much friction with said gear 118. By tilting the gear 118 at 30 degrees, it offers a good saddle ride to the power chain 101 without too much wearing friction. As the sail mast 110 always vertical, the gap between the rollers 119 and 120 must be vertical also that is why roller 119 and roller 120 are required to be in the form of cone-frustum with the first roller inverted. The long toothed gear 118 and the roller 119 have common axil that integrates them together which is also tilted 30 degrees. To make the axils of the roller 119 and 120 the rigid housing frame 121 is also tilted 30 degress by attaching the suspension cable 108 at a high point to the right of said frame 121 and the other suspension cable 108 attached at a lower point to the left end of said frame 121, and by making both left and right suspension cable 108 stay in equal elevation. Roller 120 is provided with strong spring at the bearing at both ends of its axil that will always press it against roller 119 to prevent the upper cable of the power chain 101 from moving too much donw ward and sit side-by-side with the lower cable on the long tooth gear 118—upper cable should sit on top of the lower cable, if ever.

This figure also illustrates construction of sail 100 showing the pipe frame 161, zipper 162, reinforcing string grid 117 and 164.

FIG. 4 illustrates an embodiment of the invention No. 10 named as—"UNITED SAIL WINDMILL TYPE-5 which works in the same principle as the aforementioned windmill Type-4 FIG. 1 except that it is made into a double story windmill and it is elevated high in mid-air in order to get the benefits from the higher speed winds. In theis Type-5 windmill, the terminal gears 102 are smaller than those of the Type-4 but there are two gears for each chain at each terminal. Said terminal gears 102 are made to be far apart to make the return trip of the sails stay from the forward line in order that the return sails will get more benefits from the wind. This type-5 windmill most importantly emphasizes the possibility of maximizing wind contact at the least cost of construction using a limited land space using very tall support structures to build a multi-story windmill. To build this type-5 windmill, the Type-4 windmill will be elevated high to the mid-air by means of the steel tower 129, the tower arms 128, the terminal gear bearing holder 122, the terminal gear interconnecting chain 125, the energy transmitter chain 126 with the corresponding transmitter gears 123 and 124, and the central drive shaft 127 that receives the power from the different levels of windmill.

Figure 5:
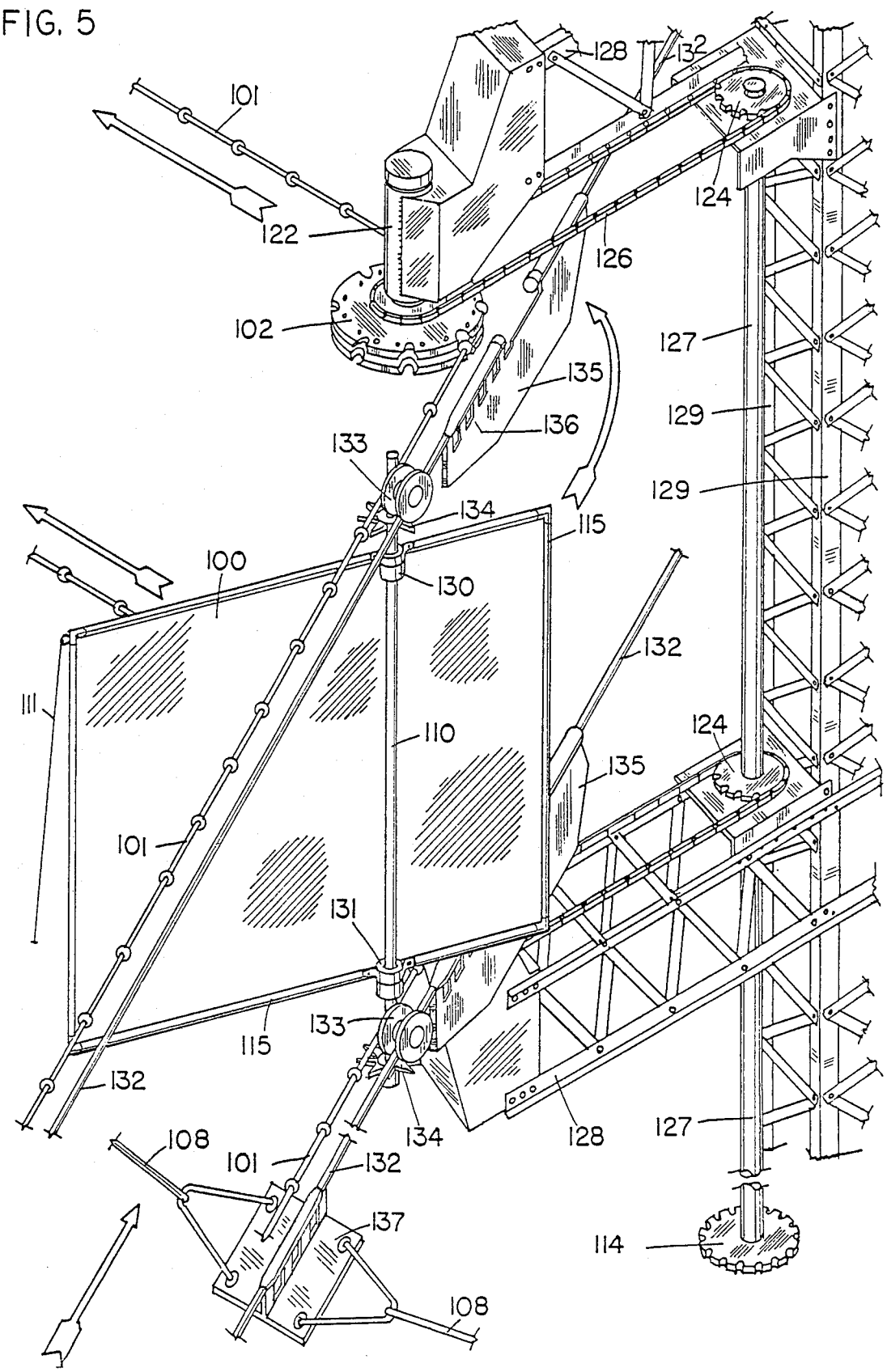
FIG. 5 is a detailed perspective view of the Terminal Station of a United Sail Windmill wherein the sails are carried by Aerial Cable Railway as described in claim-1, wherein a long toothed Lock Gear 134 is provided at each end of each sail-mast to prevent derailment during violent weather.

FIG. 5 illustrates an embodiment of the invention No. 1 named as "UNITED SAIL WINDMILL TYPE-1 which is the same high elevation multi-story windmill as the aforementioned Type-5 windmill, except that the whole weight of the sail is carried by a suspension high tension Cable Rail 132 which is keepped in place elevated in mid-air by means of tall posts or steel towers. The presence of the Cable Rail 132 relaxes the Power Chain 101 from the vertical weight of the sail 100—a condition giving the chance to use a smaller and lighter Power Chain 101 as illustrated in this figure.

This FIG. 5 also illustrates an embodiment of the invention No. 6 named as "ROLLER PULLEY WITH GEAR LOCK RUNNING ON/OFF A SUSPENDED CABLE RAIL" which is an ordinary roller pulley 133 attached to the top end of the sail mast 110 in line with the upper Power Chain 101 and the other roller pulley 133 is attached at the lower end of the sail mast 110 in line with the lower Power Chain 101—each pulley rolling on the upper and lower Cable Rail 132 respectively. To prevent the roller pulley 133 from being derailed during violent weather, the long toothed Lock Gear 134 is incorporated by attaching it to the sail mast using the said mast as its axil, fixed just touching the lips of the roller pulley 133 inclosing the Cable Rail 132 in between the roller pulley 133 and Lock Gear 134.

This FIG. 5 also illustrates an embodiment of the invention No. 7 named as "CABLE RAIL SWITCH ON/OFF CONNECTOR" 135 which brings out the opportunity to cut off the cable rail 132 at the terminal to allow the roller pulley 133 get off the rail 132 and to permit the roller pulley 133 to make a turn around the Terminal Gear 102. Said connector 135 is a strong steel plate able to hold the Cable Rail in place with special windows 136 in correct size and spacing in straight line just below the cable rail 132 to allow the free passage of the Lock Gear 134. Said connector 135 also allows the free entry of the roller pulley 133 and the Lock Gear 134 into the cable rail 132 after the turn around.

This FIG. 5 also illustrates an embodiment of the invention No. 8 named as "CABLE RAIL INTERMEDIARY SUSPENSION SUPPORT" 137 which brings about the opportunity to expand the windmill into a very large and very long line (1 mile or more) by supporting and relaxing the cable rail at certain points or distances along its span length. Said suspension support 137 is a strong plate that holds the cable rail 132 in place and support it laterally and vertically. Said plate 137 is provided with special windows 136 in correct sizes and spacing in straight line just below the cable rail 132 to allow the free passage of the Lock Gear 134. Said intermediate support plate 137 is suspended in mid-air by guy ropes 108 tied to tall structures.

FIG. 6 illustrates an embodiment of the invention No. 3 named as "UNITED SAIL WINDMILL TYPE-3" which has the same principle as the herein aforementioned windmill Type-2 except for the following new special features:

1. All the wind sails 100 are rolling on a closed loop rail road track 140;
2. Only one closed loop power chain 101 is used to gather all the energy from the sails;
3. Each of the Sails is carried by a separate triangular push car with its wheels locked or hooked to the rails;
4. There are three terminal gears installed in triangular formation at each end of the loop to receive the energy from the power chain 101;
5. The rail (in the form of flat bar metal or timber bar) is elevated from the ground by the support structures 143 and 144 to give chance for the lower wheels 142 to do a hook grip at the bottom of the rail 140.

As the wind blows, the sail 100 pushes upon the mast 110 at the same time pulls the preceding mast 110 thru the control rope 111. The mast 110 in turn pushes or pulls the structural braces 145 transmitting the force to the structures of the car 146 making the wheels 141 start rolling on the rail 140 while the wheel 142 prevents the overturning of the car by pressing against the bottom of the rail 140. As the car moves forward, it pulls the rope 148 which in turn tugs the power chain 101. The power chain 101 turns the terminal gears 102 which drives the synchronizing chain 125 which joins the forces of the three terminal gears. The center terminal gear drives the Power takeoff 114. Rope 147 holds high the sail thru bearing 131 that allows the sail to turn around the mast.

FIG. 7 illustrates an embodiment of the invention No. 2 named as "UNITED SAIL WINDMILL TYPE-2" which has the same principle and of similar construction as the aforementioed windmill Type-1 except for the following special features:

1. The whole windmill system is floating on water;
2. Each of the wind sails 100 is carried by a separate boat 154 on which the mast 110 is erected;
3. The terminal gears 102 are installed on top of a floating barg 153 which is held in place by anchor blocks 112 thru guy rope 108.

As the wind blows the wind sail 100 exerts force on the boat 154 to a direction opposit to where the wind is reflected. As the sail 100 tends to overturn the boat 154, the counter weight 151 moves to the edge of the boat thru a small rail by action of a rope being pulled by the sail 100. As the boat 154 moves forward it tugs the Power Chain forward by the tup rope 148. The boats 154 turn around at the terminal by the action of the Power Chain 101 upon the front tug rope 148 which pulls the boat 154 to where the power chain 101 is going. The fender plate 152 prevents the boat 154 from getting over into the other side of the power chain 101, at the same time prevents the boat 154 from being blown side ward by the wind resulting to an unnecessarily stress to the power chain 101. In the event of a violent weather the boat floaters 150 and the barg 153 will be deflated to submerge the whole system under water to scape distruction by strong winds and heavy water waves. When the hurricane is gone, the whole system will be refloated again by means of compressed air. This type of windmill is expandable as much as the open ocean.

FIG. 8 illustrates an embodiment of the invention No. 11 named as "UNITED SAIL WINDMILL TYPE-VI" which has similar construction as the aforementioned windmill Type-4 except for the following special features:

1. The axil 105 of the terminal gears 102 is horizontal;
2. The sails are blown up and spread open by the wind upon turning up and ride on top of the pair of Power Chain 101.
3. The sail 100 carries with it additional sails 200 that flip out on each side and another 3rd one down ward between the power chain 101 to maximize blockade against the wind for more energy benefits;
4. The whole system is an inclined line where the front terminal gear is at a low elevation and the rear terminal gear 102 is at a much higher elevation using a much taller post 103 or at the top of the hill to get more wind for the sails.

As the wind blows all the sails 100 and 200 that are on top of the power chain will spread up wide open and move the chain 101 to the rear and turn the terminal gears 102 which in turn drives the axil 105 which turns the power take off 114. As the sails turn down at the rear terminal and go under the power chain, they flip closed and relax to the wind forces. Guy bar 108 makes the structures stand up rigidly. Bar 110 is the sail mast in horizontal position which holds all the four sails at one point. Part 111 is the guy rope that makes the sail stand rigid against the wind. The ground foundation 113 hold the post 103 in place.

BEST MODE FOR CARRYING OUT THE INVENTION:

Similarly, as it has been discussed in the preceding application Serial No. 06/631,321, now patent No. 4,756,666, the same mode is adopted into this application using FIG. 5 as the model it being the "Type No. 1 United Sail Windmill". As stated in the forgoing summary, the main objective of this invention is to maximize wind contact at the minimum use of materials and at the minimum use of space. The more steady and higher wind speed is located high above the ground. The wind is most efficiently deflected by a large, wide, squarefaced wind sail that forms a concave surface against the wind. Referring to FIG. 5, the sail 100 is made of durable fabric materials attached to a large, light square frame 115 which is made of light materials such as aluminum pipe, in order to build a concave, large, light sail. For better wind speed, this sail must be placed high above the ground and must be moving horizontally at transverse to the general wind direction— —and the most logical and most economical carrier for the large sail on this condition is a two level Aerial-Cable Railway 132 that is provided with mid-span intermediary supports 137 at regular interval all along the span lengths to prevent sag and overloading. To maximize wind contact out of the available project space and out of the available railway span, the large sail 100 must be arranged on a single file along said railway close to each one after the other but with clearance between sails to allow every sail to flip to the right or to the left. A deep-groove Roller Wheel 133 is attached to the top and to the bottom of each sail mast 110 to carry the top of the sail along the upper level railway and to carry the bottom of the sail along the lower level railway 132 respectively. The groove of said Roller Wheels 133 is deep enough at least 5 times the diameter of the cable Railway 132 so that it will not get off the aerial railway during the violent weather. Another line of two level aerial railway 132 is built parallel to the first line of aerial railway to carry the sails that are moving to the opposit direction and returning to the point of origin. The opposit railway is also provided with intermediary supports 107 at the upper level and at the lower level for the same reason as the first—that is to prevent sag, overloading, sideward swaying due to the horizontal wind forces, and to be able to build a very long aerial cable railway at a generally horizontal posture, and to be able to carry much larger sails at lesser stress. It should be noted at this point that one of the main objectives of this invention is to build a large commercial scale windmill—that is to make the sails as large as possible and to accomodate as many sails as possible into this aerial-cable railway system, that is why the mode should be to build the railway as long line as the project space allows—to make the windmill more and more powerfull without the necessity of building additional set up units of windmills. For further better wind-contact, these two opposit aerial railways must be built far away from each other (say 100 or 300 feet apart) so that the second line of sails that is behind the first line of sails will be located in a area where the wind has regained speed in a laminar flow after bumping with the frst line of sails. This condition requires the three Terminal Gear Wheels 102 (as shown in FIG. 4, FIG. 6, and FIG. 7) are held in place far apart from each other in a half hexagonal formation for every level of the end loop, to effect separation of the two lines of sails sufficiently without the use of expensive wide diameter gear wheels. This set of three Terminal Gear Wheels 102 holds firmly and stretches tautly the end loop of the upper level Power Cable 101 and another set of three Terminal Gear Wheels 102 do the same to the opposit end loop of the upper Power Cable 101 at the left terminal which is not shown in the drawing FIG. 5. The same proceedure of the terminal gear wheels 102 is done with the left and the right end loops of the lower level Power Cable 101. Both the upper level and the lower level Power Cable 101 which have equal lengths are tautly strung by the Half-Hexagonal Sets of terminal gear wheels 102. All the upper ends of the vertical mast 110 of each sail are functionally attached to the inner side of the upper level Power Cable 101, and all the lower ends of the vertical masts 110 of each sail 100 are also functionally attached to the inner side of the lower level Power Cable 101 in equal spacing close to each other but allows the sails to flip to the left or to the right. It should be noted at this point that the circumference of each of the Terminal Gear Wheels 102 is equal to the spacing of the sail masts 110 because there will be a special notch at one point of the circumference of each said gear wheels to catch the masts 110 and there will be smaller notches around the circumference of each said gear wheels 102 to catch each of the drive teeth or keys that are also clamped on the inner side of said Power Cable 101. It should be noted again at this point that the said Power Cable 101 drives the Terminal Gear Wheels 102 by its drive teeth or keys and by the ends of the Masts 110 and not by its friction upon the groove of said gears wheels 102 therefor, said gear wheels should be so constructed that the Power Cable 101 will not be touching the inner surface of the grooves which should be lubricated. In this way, the speed of the Power Cable 101 will be controlled by the notches on the said Gear Wheels 102 so that the upper level and the lower level Power Cable 101 will be moving in equal pace to keep the mast always stay vertical—not being affected by the small differences in circumference between the said Gear Wheels 102. As there will be more sails being attached to the Power Cable 101 by making it longer, it will have more driving force upon the Gear Wheels 102—which condition requires more drive keys clamped to the Power Cable 101 between the masts 110 and correspondingly more notches made on the circumference of the Terminal Gear Wheels 102 to match the power capacity of the windmill. A Power-Support Chain 106 is necessary to collect the mechanical energies of the Terminal Gear Wheels 102 and to deliver said energies to Gear Wheel 102 for every end loop of the upper and lower level Power Cable 10. in order not to overload the notches of Gear Wheels 102.

What I claim for which protection by a patent is applied, are defined as follows:

1. A United Sail Windmill that converts wind energy into consumable energy in the form of compressed air, electricity, hydrogen gas fuel, and elevated water, and/or to serve as direct prime driving machine, comprising:

A plurality of large square-faced wind sails, made of light thin metal sheets or strong light cloth/fabrics fastened together to a light strong square frame, put together in great quantities, arranged in a single file procession closed to each one after the other with a clearance to allow each sail to flip to the right or to flip to the left and moving along a long straight line in one direction and along another long straight line parallel to the first line but moving to the opposit direction—transverse to the general direction of the wind;

A vertical mast for each sail, made of light strong materials such as bamboo poles or reinforced aluminum pipes, that holds the sail in place at vertical posture and at the same time serves as frame member to which the said fabric is attached to, the top end of which is reinforced by steel pipe or bar that is securely attached to the upper Power Cable Chain to serve as drive teeth of said Power Cable Chain, the bottom end of which is also reinforced by steel pipe or bar that is securely attached to the lower Power Cable Chain to serve as drive teeth of said Power Cable Chain;

A pair of Power Cable made of strong rope, one at the upper level and one at the lower level as mentioned above, which are tugged by each of said large sails moving in equal pace, which form an endless drive chain having two end loops that are quite apart from each other (may be ½ mile or more apart), to which the upper end and the lower end of each sail-mast are securely attached respectively, which are provided with drive teeth by clamping to same three or more vertical short bars in between the spacing of each sail-mast that are strong enough to drive the terminal gear wheels;

A set of three Terminal Gear Wheels arranged in a half-hexagonal formation to hold and stretch out each of the end loops of the said upper level and the lower level Power Cable, which are driven by said Power Cable thru its drive teeth that fit into the notches on the circumferencial edges of the said Gear Wheels;

Said three Terminal Gear Wheels are quite far apart from each other such that the half-hexagonal formation has a radius of 100 feet or more in order to sparate the two long parallel lines of sails away from each other for better wind contact;

An Aerial-Cable Railway parallel and 1 to 3 inches close to each and every level and every line of said Power Cable, which is a high tension steel or nylon rope, suspended or held in place by tall posts or steel towers separate from the support posts for the said terminal gear wheels, which will carry the whole weight of each and every sail including the weight of the Power Cable plus the weights of the deep-grooved carrier Roller Wheels, which will hold the sails from swaying sideward due to the horizontal forces of the wind, and which will relieve the Power Cable from vertical loads at the same time prevents overloading of the Terminal Gear Wheels;

A deep-grooved carrier Roller Wheel securely attached to the top end and to the bottom end of each and every sail-mast at the point where the Power Cable is also connected to each mast, which rolls on said Aerial Cable Railway carrying the sail as being pushed by the wind, the deep groove of which being at least 5 times the diameter of the Aerial Cable Railway so that it will not be de-railed during violent weather or when it is working with high speed winds;

An Intermediary Suspension Support in the form of catenary wires or ropes strung in various strategic poinsts along the span length of said Aerial Railway, transverse to and connected to various strategic points of the upper level said Aerial Railway by means of an erect "T" connectors with the tip of its bottom hook being the one clamped to the said railway to lift it from below giving clear passage of the carrier roller wheels, and connected to various trategic points of the said lower level Aerial Railway by means of an inverted "T" connectors with the tip of its tail being the one clamped to said railway to lift it up from below giving clear passage of the carrier roller wheels running on the lower level Aerial Railway, the purposes of which are to provide rigid support (vertically and horizontally) to the Aerial Cable Railway to prevent sag and to provide the opportunity to build longer lines of aerial railways;

A Cable-Rail Switch as illustrated by 135/136 named in the summary as "Labrador Cable-Rail Switch", made of laminated steel plate or hardwood plate (depending upon the kind of Aerial Railway) with a deep groove to house said cable railway and provided with clipping accessories such as "U"-Bolts and clipping block, and further provided with a horizontal arc-tang to guide the deep-groove carrier roller wheel, which is clipped to the Aerial Cable Railway at the location of every Terminal Gear Wheel at the exact point where the sail-mast is forced to make a turn by the Power Cable, in order to effect smoth transfer of the sails from one Aerial Railway to the next Aerial Railway of different direction;

A Terminal Power Station as per 102, 126, 124, 127 constructed at each end loop of the Power Cable (the right end and the left end of the windmill) which is an assembly comprising (a) the aforementioned set of three Terminal Gear Wheels in a Half-Hexagonal formation, (b) a vertical Gear Shaft holding each and driven by each of the said Terminal Gear Wheels, (c) a Power Gear held and driven by each of the said vertical Gear Shafts, (d) a Power Support Chain which interlocks the upper level set of three Terminal Gear Wheels and another Power Support Chain interlocking the lower level set of three Terminal Gear Wheels to remove concentration of force upon the said first Terminal Gear Wheel being exerted by the said Power Cable, and to serve as energy collection agent;

A vertical Power Shaft, being a part of said Terminal Power Station, which holds and being driven by an upper level Power Gear and by a lower level Power Gear;

A Power Chain, being a component of said Terminal Power Station, which interlocks the Power Gear attached to the Gear Shaft of the said upper level first Terminal gear Wheels with the Power Gear attached to the upper end of the said Power Shaft, and another Power Chain (the same kind and length as the first) interlocking the Power Gear attached to the Gear Shaft of the said lower level first Terminal Gear Wheel with the Power Gear attached to the lower end of the said Power Shaft, by which the said vertical Power Shaft is driven by the Terminal Gear Wheels, and by which the forward pace of the upper level Power Cable is controlled to become equal to the forward pace of the Power Cable at the lower level, so that the sail-mast will stay vertical at all times—not being affected by the small differences in circumference among the Terminal Gear Wheels it being that they have equal number of circumferencial notches or teeth;

A Power Take-off Gear Wheel securely attached to the bottom tip of the said vertical Power Shaft;

A Diagonal Brace String tautly tied to the bottom-outer corner of of the sail frame and connected to the top-inner corner of said frame to make the sail stay square against its own weight;

A control string tied to the outer-top corner and another string tied to the outer-bottom corner of each sail that hold the sail stay rigid against the wind by tying its opposit end to the upper end of the succeeding sail-mast and the opposit end of the lower control string tied to the bottom end of the said succeeding sail-mast, holding the sail 45 degrees with the Power Cable;

Said control string is provided with a Short-Hook String that is calibrated to snap-off to release the sail automatically during violent weather or when the wind speed becomes beyond the working limit, making the sail neutral to the wind to save the whole windmill from destruction;

A Horizontal Arm Structure for each and every Terminal Gear Wheel, long enough to hold one said wheel away from the support post to provide clear passage of the large sails when they flip towards the said support post due to the wind direction, and strong enough to hold the said Terminal Gear Wheel in correct position against the high tension Power Cable pulling it outward;

A Support-Post Structure for every pair of Horizontal Arm Structure (upper and lower level) to hold same high above the ground for a better wind contact, which can be in the form of wood poles or in the form of steel towers;

A support post structure for every end of the Aerial Cable Railway and for every end of said Intermediary Suspension Support, each support post structure carry two levels of Aerial Cable Railway or two levels of Intermediary Suspension Support;

Guy Wires to hold and keep erect all Support-Post Structures;

A Transmission Gear, stick-shift, 5 or more speeds, driven by said Power Take-off Gear Wheel, to increase or decrease driving speeds depending upon the wind speeds and/or power output of the windmill;

An air compressor, driven thru said Transmission Gear, to produce compressed air and store same in large tunnel reservoirs;

An electric generator driven by an air turbine;

An electrolizer to produce oxygen and hydrogen gas fuel out of the electricity generated by electolysis of water;

A water pump driven thru said Transmission Gear to store energy in the form of elevated water;

A long-toothed lock gear functionally connected to the mast as illus-by part 134 using the mast as its axil freely rotating but vertically immovable to be sweeping the lower lips of the carrier wheel 133 to prevent same from being derailed by the violent weather;

A switch for the cable rail, part 135, and also a rail Support 137, having windows 136 that allows free passage of the long-toothed lock gear when the sail moves forward.

2. A United Sail Windmill" in accordance with claim-1 wherein the windmill is floating on water and each of the windsails are carried by a boat thru a vertical sail mast erected at the center of said boat, and comprising:

(a) A carriage boat (without a rail track) of any appropriate size (a large ocean going vessel if windmill on the ocean) in the form of an "H" frame floating on water or rolling on flat grounds/snow thru its wheels at its four corners, that carry and completely support one large sail each thru a mast erected at the center of said boat and thru guy ropes that hold the sail against the wind at a calibrated tension as it flips to the left and to the right;

A plurality of said sail boats tied to and tugging a closed loop power chain forming a long line (a mile or more) of parading sails in one direction and another long line (same length as the first) of parading sails in the opposit direction as shown by attached drawing FIG. 7;

(c) Said mast is held rigidly vertical by means of two struts mounted on one side of said boat along side of the power chain forming a triangular pyramid with the said mast to allow the sail revolve around the mast by 130 degrees;

(d) Said boat is provided with a heavy counter weight that keeps transfering to either side of said boat thru a rail along the center bridge of the boat by the left/right flipping of the wind sails thru a complete loop string and pulley mechanism;

(e) Said boat is provided with fender plate attached to the front and rear side of the boat facing said power chain, extending down 5 feet below water surface to prevent the said boat from moving over the said power chain and to prevent the said boat from being blown side ward by the strong winds;

(f) Said boat is made to be submersible to hide underwater when ever the whole windmill system is threaten by violent weather conditions, and then refloated again by injecting compressed air into the said boat after the destructive weather is over or the wind has come into within working limits;

(g) A power terminal barge at each end of said power chain loop in the form of a pentagon or triangular flat deck which carry the said terminal gears, the compressors, other equipment, and to house the operating personnel;

(h) Said barge is anchored to the sea bed by heavy rocks or concrete blocks thru guy ropes in three directions that tends to stretch the power chain to both ends of its loop;

(i) Said barge is made by submersible to hide underwater whenever the whole windmill system is threaten by violent weather conditions, and then refloated again by injecting compressed air into said barge after the destructive weather is over or the wind has come into within working limits;

(j) An intermediate support to the said power chain at an interval of every other three boats, in the form of a deep roller pulley with lock gear similar to Part No. 107 and 118 that support the bottom power chain of said windmill Type-I, carried by a four (4) peice raft which is connected by strut to another raft that supports the opposit power chain;

(k) Said intermediate support assembly floats between the said power chain and achored to the sea bed by ropes to hold the power chain in place and in correct alignment against the forces of the wind;

(l) A compressed air pipe running underwater to deliver the produced energy in the form of compressed air to the central reservoir or to any central power plant at sea or on the land.

3. A United Sail Windmill in accordance with claim-1 wherein the windmill is running on a Rail Road Track on land and each of the windsails is carried by a railway carriage car thru a vertical mast, and comprising:

(a) A long rail track in the form of a steel flat bar or timber bar elevated at least one (1) foot above the ground with its wide faces vertical and its side edges on top and bottom (are provided with steel lining in case rail is timber), that is parallel with and at least (100) feet from another long rail track of the same kind in the opposit direction and with which it makes a closed loop, as exemplified by the attached drawing FIG. 6;

(b) A plurality of rectangular or triangular carriage car the wheels of which are in the form of deep roller pulleys or a group of wheels in a special formation that bite on the rail track bar (top and bottom of rail) making an anchor effect to prevent overturning by action of the winds, that carry the wind sails by rolling along the rail track making a merry-goround on the said closed loop rail road track;

(c) A sail Mast that is erected on and carried by the said carriage car at its middle or directly riding on one of the said carriage wheels, supported to stay rigidly vertical by two slant struts resting on the opposit corners of the said carriage, which completely support the sail in all direction of the wind, allowing the sail to be flipping to the left or to the right;

(d) A complete loop chain of the same length as the inner rail track, which is carried and tugged by the said carriage cars by means of another short chain tied to one or two corners of said carriage cars;

(e) A group of two or three terminal gears installed horizontally at each of the two terminal end loops of the said rail road track thru which the said power chain makes a bite to transmit the energy of the sails to the gears and thru which the carriage cars make a turn around;

(f) A complete loop synchronizing chain that interlink the said group of terminal gears to effect concentration of mechanical energy into the power take-off gear from the other terminal gears;

(g) A concrete footing or any rigid structure that holds in place and completely supports each of the said terminal gears in a half-hexagonal formation;

(h) A plurality of horizontal tie bars held rigid on top of a pair of post, perpendicular to the said rails, equally spaced along the rails, that hold the rail in place rigidly at an elevation of at least 1foot above the ground;

(i) Said rail may be in the form of a four (4) flanged bar the cross-section of which is in the form of a CROSS the purpose of which is to reduce friction by allowing a special formation of several wheels that act on said rail in all possible directions at each corner of said carriage car.

4. A United Sail Windmill" in accordance with claim-1 wherein the windmill is constructed high above the ground by supporting it with tall structures, and wherein the windsails are carried directly by the Power Chain eliminating the use of railway support system, comprising:

A plurality of wind sails made of light thin metal sheets or strong light cloth/fabrics joined together and fastened to a light strong frame to form a large Square Face capable of stopping the wind blowing at 40 mph by installing a wire or string grid reinforcement across each face of the said sail;

Each sail is vertically and operatively attached to a vertical mast in the form of a strong light pipe;

Said sail is attached to the power chain in great quantities by control ropes with calibrated springs that will hold it against the wind but relaxes it in bad weather;

Each mast is securely connected vertically to the upper chain by its upper end and to the lower chain by its lower end, —the upper and the lower ends of the mast are made very strong because they serve also as driving tooth of the power chain, as shown in FIG. 2;

A pair of strong chain herein named as "Power Chain" specially constructed to be able to drive the transverse teeth of the terminal gear wheels, each link is connected to the next link by a transverse bolt that fits into the transverse teeth of the terminal gear wheels;

Said Power Chain is a close loop with a length corresponding to the desired power capacity that can accomodate as much sails as desired—may be more than one mile long;

Said Power Chain is operatively connected to the terminal gear wheels at both ends of the windmill at may be more than one mile apart, as shown in FIG. 1;

A pair of gear wheels locked together by a long strong steel vertical pipe as axil, herein named as terminal gear, which holds rigidly the power chain in place at one end of the windmill and at the other end by another pair of gear wheels of the same kind to receive the energy from the power chain, as shown in FIG. 2;

A high footing at the lower end of the said axil to carry the whole weight of the terminal gear and to provide lateral support at the base of the said axil;

Said Axil carry and drives a power take-off gear at its lower section below the terminal gear;

A lateral support bearing structure at the upper end of the said Axil to provide lateral support in three directions to make the terminal gear stand erect rigidly against the horizontal force of the power chain;

Said lateral support structure is suspended in mid-air by by a tall structure such as wood poles, steel poles, or steel towers thru guy wires/ropes;

Said tall structure supports are made to stand erect rigidly by a guy rope/wire anchored to the ground;

Said terminal gear wheels are made to be of long radius to create a wide space for the wide sail to pass thru;

A roller pulley on a high footing thru which the lower power chain passes thru and which carry the weight of the power chain at intermediate points along its length to provide vertical and lateral support to the lower power chain to prevent overloading and sagging;

Said intermediate support roller pulley may alternatively be held in place by catenary steel cable rope that is transverse to the lower power chain as illustrated by part #107 in FIG. 1;

A long tooth lock gear installed on top of the said support roller pulley that rotates horizontally to cover the lips of the roller pulley at the same time allows the lower part of the mast to pass thru between the long teeth of the said lock gear to prevent the power chain from getting out of the support pulley during violent weather, as illustrated by part #118 in FIG. 3;

A suspension holder installed at intermediate points along the length of the upper power chain to provide lateral and vertical support to the upper power chain specially during violent weather and to remove overload from said chain permiting expansion to a very long and very large windmill, as illustrated by part 109, FIG. 3, and FIG. 3A;

Said intermediate Suspension Holder to hold the upper Power Chain while same is running may alternatively be in the form of a long-toothed gear with its axil tilted 30 degrees from the vertical that also serves as the axil for a 30 degree inverted cone frustum roller that is tightly attached to the upper face of said long-toothed gear and in tandem with another upright 30 degree con frustum roller of the same hight that makes a vertical gap with the first said roller, for the vertical mast to pass thru, on which the Power Cable-Chain makes a good saddle ride, as illustrated by parts #118, #119, and #120 shown in FIG. 3-A;

An air compressor, of any type, operatively connected to the power take-off gear of the said windmill, that will effectively produce any amount of compressed air that will be able to drive a gas turbine and/or pneumatic machines;

An air tank of any material installed above the ground or underground, or a series of large tunnels under the mountain or under the sea, that are connected to the said compressors by means of air pipes, to serve as central depository of compressed air produced by several windmills in the vicinity;

An electric generator driven by a gas turbine of appropriate size connected to the said air tank/reservoir by air pipes, to convert the compressed air into electric energy;

An electrolyzing machine connected to said electric generator to convert the electric energy into hydrogen gas fuel;

A gas compressor of any type connected to the electrolyzing machine to compress said hydrogen gas fuel;

A gas tank/reservoir to serve as storage for the said compressed hydrogen gas fuel for future consumption.

5. A United Sail Windmill in accordance with claim-1 or claim-4 wherein the long procession of windsails are constructed Double Story or Multi-story comprising:

At least two (2) levels of close loop long procession of windsails constructed high above the ground as in claim -1;

At least four (4) levels of closed loop Power Chain, the first two levels of which take hold to carry the first level line of windsails, while the upper two levels of said Power Chain take hold to carry the upper level line of windsails, of which said four levels of Power Chain also drive four levels of Terminal Power Gear Wheels—that is—one level of gear wheels for each level of Power Chain, as illustrated in FIG. 4;

At least four (4) levels of Terminal Power Gear Wheels, so arranged to provide at least two turn corners at each of the opposit end loops of the Power Chains—called the Terminal Power Stations, each corner having one independent and separate Power Terminal Gear Wheels for each and every level of power chain, each gear being a composition of two plates of equal diameter of base but the lower plate has longer teeth so it will carry the vertical weight of the power chain, while the upper plate absorbs the energy from the power chain, which terminal gear is tilted in line with the slope of the power chain to reduce friction between the power chain and the terminal gear thereby reducing wear and tear on both parts;

A synchonizing gear, of smaller diameter, integrated with each terminal gear, each connected to the next turn corner by a synchronizing chain for every level of power chain;

An axil with bearing for every terminal gear fastened rigidly to the support arms of the steel tower, said axil is cut clear near the face of each gear to allow the large sail to be able to pass thru freely between the upper gear and the lower gear past beyond the line of the axils;

Said upper terminal gear of the lower sail level and the lower terminal gear of the upper sail level are integrated together by a single short axil with bearing which is in turn fastened rigidly to the middle support arms of the steel tower;

A power transmitter gear attached to the axil of each terminal gear at the right turn corner of the windmill to transmit the energy to the central drive shaft which collects the energies from the different stories/levels of the windmill by means of a chain similar to the power chain, as illustrated by FIG. 4.

6. A United Sail Windmill in accordance with claim-1 or claim-4 wherein the upper Power Chain together with the upper end of the Sail-Masts runs thru a Suspension Support Holder comprising:

A pair of cylindrical or conical rollers, one of which is about six inches in diameter but 50% less than the other, having equal length/hight, arranged in tandem with the smaller cone inverted with both axils tilted 30 degrees to the right if the smaller cone roller is on the right side and making the gap between said rollers trully vertical for the vertical bar/mast to pass thru;

A long tooth gear, herein named as "Lock Gear", with teeth three (3) times longer than the gap between said rollers and spaced equal to or a little bit larger than the diameter of said vertical sail mast, which is integrated with and fixed at the bottom of said smaller roller at an elevation just touching the bottom of the larger roller so that the long teeth of which will just be sweeping the bottom of the said larger roller, and which is also tilted 30 degrees it being on the same tilted axil of the said smaller cone roller in order to offer a good saddle ride for the power chain on the long tooth Lock-Gear to prevent wear on said chain, as in FIG. 3-A;

A strong steel frame that houses or holds the said rollers and said Lock-Gear together in place, which may also be tilted to conform with the inclination of the said rollers;

A strong rope or steel bar attached to each end of said roller housing connected to a post or tall structure to suspend said Suspension Holder in mid-air.

7. A United Sail Windmill in accordance with claim-1 or claim-4 wherein the Power Chain is modified to become much stronger relative to its own weight by making it in the form of a stranded steel cable-rope (instead of linked steel bars) on which steel bolt-nuts are welded or crimped around said cable in appropriate spacing to serve as drive teeth, or by making said Power Cable Chain in the form of two parallel steel cable ropes which are securely connected to each other by short transverse tube-bars in appropriate spacing that serve as drive teeth upon the terminal gears.

8. A United Sail Windmill in accordance with claim-1 or claim-4 wherein axils of the terminal gear wheels are placed horizontal and the Power Chains are inclined, comprising:

Two sets of Terminal Gear Wheels constructed at different elevations such that the front Terminal Gear (facing the wind) is the one erected on lower grounds—such as the foot of the hill, while the rear Terminal Gear (away from the wind) is the one erected on the higher grounds such as the top of the hill or on the top of a tall structure post to gain elevation over the said front terminal gear so that the succeeding sail will not cover the preceding sail from the wind;

A plurality of windsails in the form of folding sections that spread wide open like an umbrella when it come face to face with the wind in such a formation that the main central sail 100 rides on top of the two parallel power chain thru a horizontal mast attached to the left power chain at one end and to the right power chain at the other end;

An auxiliary folding sail 200 is also attached to both sides of said central main sail 100 using the side frame of which to serve as mast to hold said sail 200, which open to the left and the other opens to the right when blown by the wind;

An auxiliary folding sail 200 functionally attached to the bottom horizontal mast of the said central sail 100, which spread open downward when blown by the wind, as illustrated in FIG. 8;

A Control Rope attached to each outer corner of said folding sails to hold them firm against the wind, which is calibrated to relax the sail during violent weather by means of steel springs or suspended weights;

An intermediate support to the said power chain in the form of a long-toothed gear wheel that fits into the said power chain, which is carried by a correspondingly tall structure to prevent the said power chain from sagging down and to releave the said power chain from too much vertical load specially when the windmill system is constructed into a very long line of parading sails;

A means to assist said folding sail assembly to fold closed when moving on the return trip against the wind, in the form of calibrated steel springs;

A power take-off gear attached to the axil of the lower front terminal gear, to drive the compressor or other mcahineries.

9. A United Sail Windmill in accordance with claim-1 or claim-4 wherein the windsails are in the form of light framed fabric but they are provided with reinforcing string grid on both faces, as shown in FIG. 3A, in order to withstand the high speed winds.

10. A United Sail Widnmill in accordance with claim-1 or claim-4 wherein the windsails are in the form of framed woven thin metal strips in order to make it strong but flexible to assume a concave form when blown by thé wind.

11. A United Sail Windmill in accordance with claim-1 or claim-4 wherein the windmill is constructed underwater in the ocean to work as water-turbine, and wherein a plastic Pipe Floater is attached horizontally along the length of the upper side framing of each sail enough to neutralize the weight of the sails including the weight of the Power Chain to remove sag, for the purpose of taking benefits from the ocean current.

12. A United Sail Windmill in accordance with claim-1 or claim-4 wherein the lower Power Chain including the bottom tip of the vertical mast runs thru a bottom intermediary support system comprising A strong steel angle flat-bar connected vertically on top of a post, having its shorter angle makes a horizontal top plate;

A deep groove Roller Pulley having its axil horizontally connected to said vertical flat-bar, which directly carry the weight of the Power-Chain-Sail-Mast assembly;

A means to prevent the Power Chain from getting out from said Roller Pulley, which is in the form of long-tooth Lock-Gear having its axil vertically connected to said horizontal top plate of said angle flat-bar, in order to enable the windmill to work in high-speed winds and to prevent derailment during violent weather, as illustrated by part #118 in FIG. 3.

* * * * *